United States Patent [19]

Kantner

[11] Patent Number: 4,463,570
[45] Date of Patent: Aug. 7, 1984

[54] METHOD OF DETERMINING A SET POINT FOR A TEMPERATURE PRESSURE CONTROLLER OF A HEAT PUMP

[75] Inventor: Alexander Kantner, Remscheid, Fed. Rep. of Germany

[73] Assignee: Joh. Vaillant GmbH

[21] Appl. No.: 438,892

[22] PCT Filed: Mar. 12, 1982

[86] PCT No.: PCT/DE82/00060
§ 371 Date: Sep. 30, 1982
§ 102(e) Date: Sep. 30, 1982

[87] PCT Pub. No.: WO82/03267
PCT Pub. Date: Sep. 30, 1982

[30] Foreign Application Priority Data

Mar. 14, 1981 [DE] Fed. Rep. of Germany ... 8107912[U]
Feb. 17, 1982 [DE] Fed. Rep. of Germany ... 8205716[U]

[51] Int. Cl.$^3$ .......................................... F25B 15/00
[52] U.S. Cl. ......................................... 62/101; 62/476
[58] Field of Search ................... 62/101, 476, 141, 148

[56] References Cited

U.S. PATENT DOCUMENTS

| 2,850,266 | 9/1958 | Merrick et al. ............... 62/148 X |
| 3,426,548 | 2/1969 | Greacen et al. ................ 62/148 X |
| 4,090,372 | 5/1978 | Lamb ............................. 62/148 X |
| 4,269,034 | 5/1981 | Rzechula ........................ 62/476 X |
| 4,285,209 | 8/1981 | Luthi et al. ..................... 62/476 X |

Primary Examiner—Lloyd L. King
Attorney, Agent, or Firm—Toren, McGeady and Stanger

[57] ABSTRACT

The present invention relates to a method of determining the set point of a pressure and temperature controller for the high-pressure part of a sorption heat pump.

Since the manufacturer of sorption heat pumps does not know from the outset at which location the heat pump is to be installed, such heat pumps cannot be preadjusted, but must be adjusted individually at the location of installation in accordance with the requirements of the user and the expected outdoor temperature.

It is the object of the present invention to provide possibilities for preadjusting the temperature and pressure controllers of sorption heat pumps to values which are subsequently varied only in dependence on the day-to-day operating conditions.

This object is met in that, as a preadjustment, the maximum power which can be delivered to a consumer is associated according to a linear proportional characteristic curve with the lowest outdoor temperature to be expected in a climatic zone, and that the nominal power is subsequently determined between the maximum power and zero as a linear proportional function of the sensed outdoor temperature, and the resulting reference value is converted to a nominal pressure/temperature value for the controller.

4 Claims, 6 Drawing Figures

METHOD OF DETERMINING A SET POINT FOR A TEMPERATURE PRESSURE CONTROLLER OF A HEAT PUMP

The present invention relates to a method of determining the set point in accordance with the preamble of the main claim.

Pressure and temperature controllers may be used, inter alia, in sorption heat pumps, particularly absorption heat pumps, in order to maintain at constant levels or to adjust at pre-determinable set points the pressure or the temperature in the high-pressure part of the sorption heat pump. In this connection, the high-pressure part is that portion of the generator which extends to the expansion valve in the refrigerant flow path and in the flow path for the weak solution.

As absorption heat pumps are delivered to and installed in various regions, it is rather difficult to pre-adjust the set point signal generators of such pressure and temperature controllers.

It has been found, however, that this can be effected by reference to the so-called climatic zones, into which at least the territory of the Federal Republic of Germany is divided. These climatic zones constitute regions in which respective certain lowest outdoor temperatures must be expected.

For this reason, it is an object of the present invention to provide possibilities for pre-adjusting the set point signal generators of temperature or pressure controllers of sorption heat pumps to values which are subsequently varied only in dependence on day-to-day operating conditions.

For accomplishing this object, the invention resides in the characterizing features of the main claim.

Further embodiments and particularly favorable further developments of the invention result from the subclaims and the following description, in which an illustrative embodiment of the invention will be explained more fully with reference to the drawings.

In the drawing.

The additional

In all figures, like reference characters designate like details.

Figure 1:
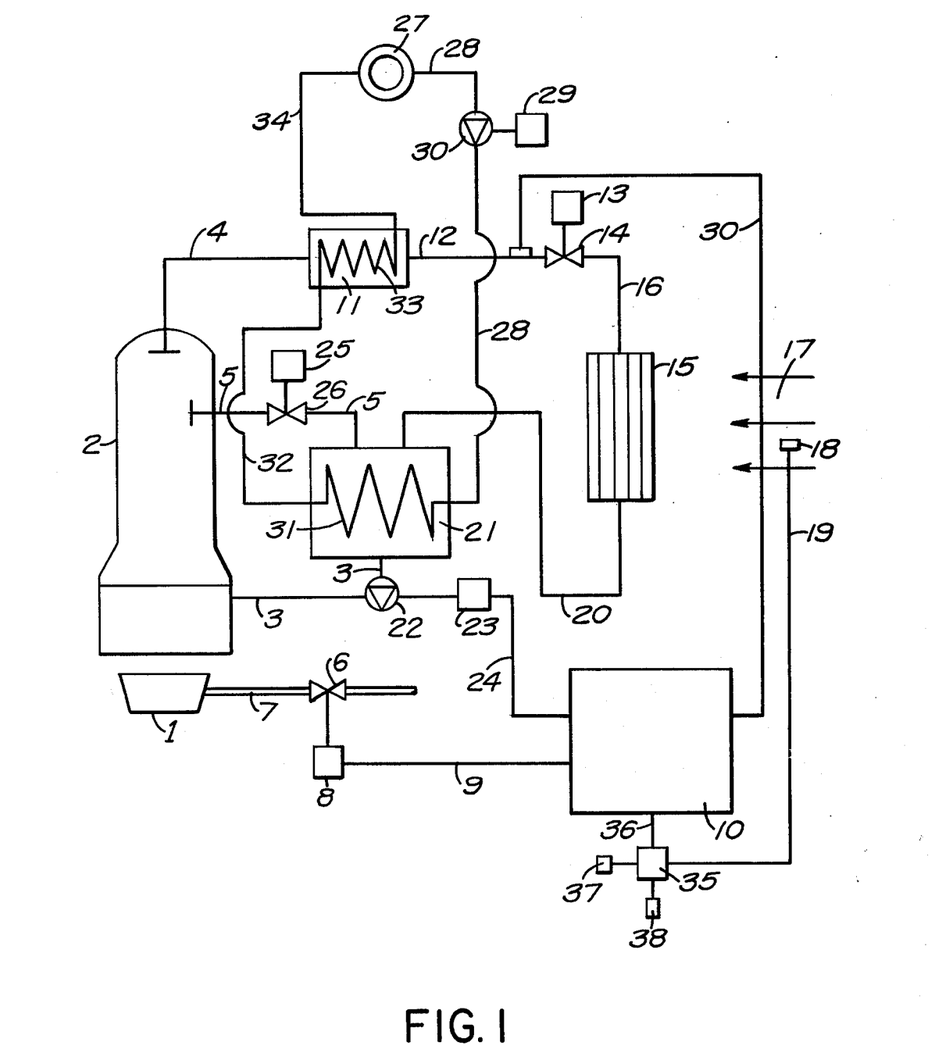
FIG. 1 is a diagrammatic representation of the connections of an absorption heat pump.

An absorption heat pump operating on the basis of ammonia/water as shown in FIG. 1 comprises a generator 2, which is heated by a burner 1. A conduit 3 for rich solution opens in the generator and a conduit 4 for refrigerant vapor and a conduit 5 for weak solution extend from the generator.

The burner is a gas or oil burner, which is fed via a fuel supply conduit 7. The latter incorporates a fuel valve 6, which is controlled by an actuator 8, which is controlled via a control line 9 by a controller 10.

A condenser 11 is connected to the refrigerant vapor conduit 4, which is continued by a condensate conduit 12 to an expansion valve 14, which is provided with an actuator 13 and succeeded by a refrigerant conduit 16 leading to an evaporator 15.

The evaporator is fed by an ambient energy source, such as, outdoor air or underground water 17. The temperature of the source may be sensed with a temperature sensor 18, which is connected by a signal conduit 19 to the controller 10.

A refrigerant vapor conduit 20 leads from the evaporator 15 to an absorber 21, from which the conduit 3 extends back to the generator. A solvent pump 22 incorporated in the conduit 3 is controlled by an actuator 23, which is connected by a control line 24 to the controller 10.

The conduit 5 for weak solution leads to the absorber 21 and incorporates an expansion valve 26, which is controlled by an actuator 25.

The sorption heat pump heats a consumer 27, which may be a collective heating system comprising convectors or radiators, or a floor-heating system and /or a service water heater. This consumer may be heated by the heat pump directly or via a three-way or four-way mixing valve which is interposed. A return main 28 from the consumer incorporates a pump 30, which serves to circulate the heating fluid and is controlled by an actuator 29. The conduit 28 extends to a heat exchanger pipe coil 31, which is accommodated in the interior of the absorber 21. A conduit 32 leads from the pipe coil 31 to another heat exchanger pipe coil 33, which is accommodated in the interior of the condenser 11. A flow main 34 leads from the pipe coil 33 to the consumer.

The actuators 8, 25 and 13 are solenoid drives having an operating range which is directly proportional to the current supplied to them by the controller 10. The actuators 29 and 33 may consist of variable transformers which are connected to the pump motors so that the pump speed is directly proportional to the control signal delivered by the controller 10. Alternatively, the pumps could be driven at a constant speed and the control function could be effected by a by-pass valve which is connected between the input and the output of the pump and the flow area of which is controlled by the control signal delivered by the controller 10. Finally, variable capacity pumps might be provided in order to vary the flow rate per stroke or per revolution while the electric drive is operated under constant conditions.

A set point signal generator 35 is connected to the controller 10 by a line 36.

The following set point adjustments can be effected at this set point signal generator 35: By a set point adjuster 37, the maximum power that can be delivered by the heat pump to the consumer 27 can be assigned to a given outdoor temperature. For instance, the territory of the Federal Republic of Germany is divided into three climatic zones. In accordance with DIN 4701 [German Industrial Standards], a lowest outdoor temperature of −12° C. must be expected in Climatic Zone 1, of −15° in Climatic Zone 2 and of −18° C. in Climatic Zone 3. For this reason, the set point adjuster 37 may be set to associate the nominal power of the heat pump, for instance, 10, 20, 20 or 50 kW, with the climatic zone in which the heat pump or its controller is to be used. If, in the example given, the heat pump to be adjusted has a maximum power of 30 kW and is to be installed within Climatic Zone 2, the controller is so adjusted by the set point adjuster 37 that a power of 30 kW will be delivered when the temperature is −15° C.

If the same heat pump provided with the same controller is to be used in Climatic Zone 3, the set point adjuster 37 will be so adjusted that 30 kW will be delivered at an outdoor temperature of −18° C. This means generally that the heat pump will deliver power between zero and maximum power at outdoor temperatures between a value at which heating is no longer desired, e.g., 18° C., and the lowest possible outdoor temperature.

Figure 2:
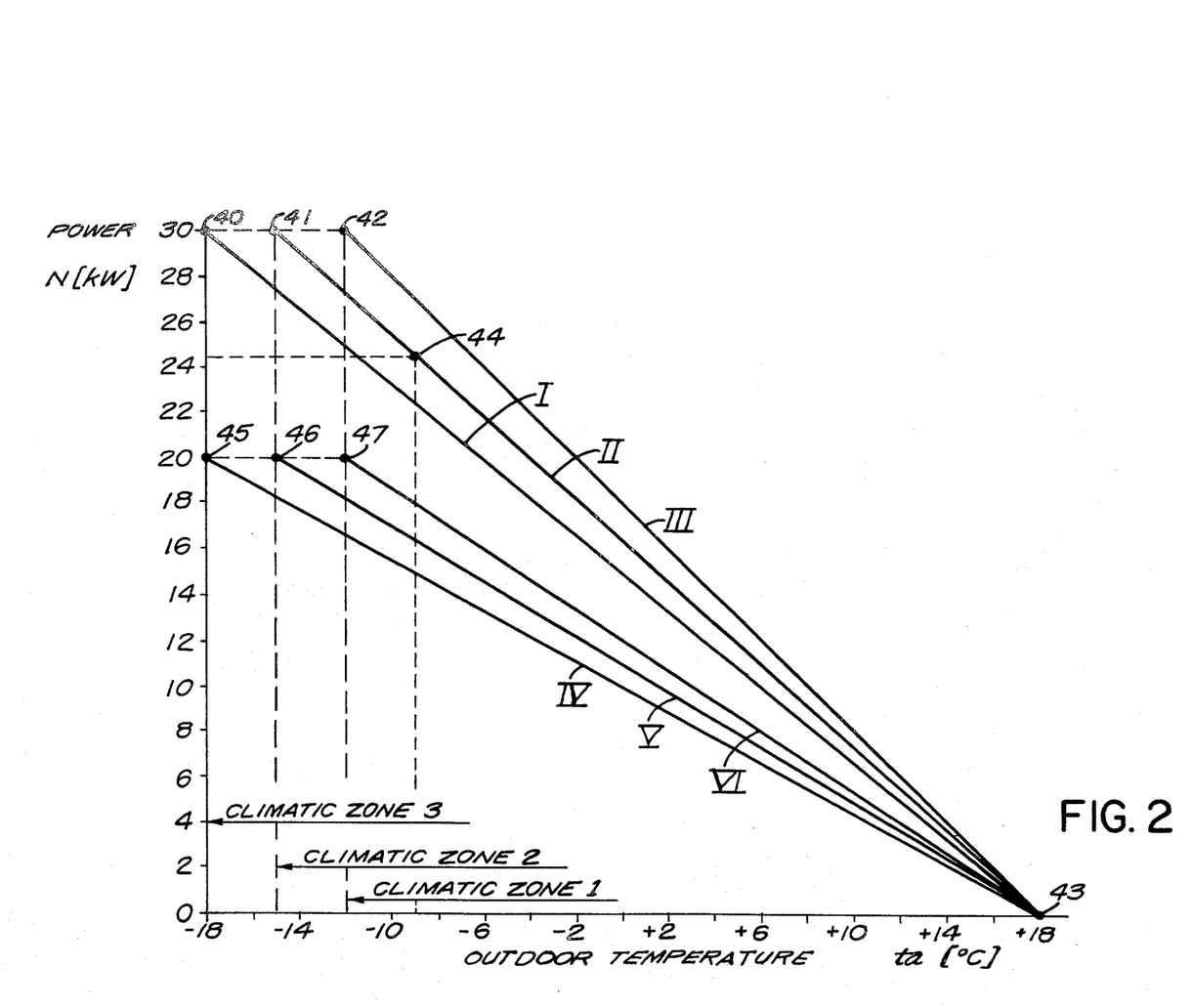
FIGS. 2 to 6 show diagrams.

The specific effects of this adjustment are apparent from the diagram shown in FIG. 2: the temperatures from the lowest temperatures to be expected in the respective climatic zone to a temperature at which heating is no longer desired are plotted against the abscissa and the maximum powers are plotted against the ordinate. The maximum power is that heat output which can be delivered by the respective heat pumps to the consumers 27. for instance, in the case of a heat pump having a maximum power of 30 kW, the adjustment is effected in such a manner that, in dependence on the climatic zone which includes the intended location, the power of 30 kW will be delivered at a temperature of −18° C. in Climatic Zone 3 or of −15° C. in Climatic Zone 2 or of −12° C. in Climatic Zone 1. The points 40, 41 or 42 thus obtained are connected to that point 43 on the abscissa which represents a temperature above which room heating by means of the heat pump is no longer required. The point 43 is connected to the points 40, 41 and 42 by straight lines, which are designated I, II and III in accordance with the respective climatic zones. It is apparent that a power of 24.5 kW delivered by the heat pump located in Climatic Zone 2 may be associated with an outdoor temperature of −9° C., as is represented by point 44.

The three additional curves IV, V, and VI of FIG. 2 will be obtained if the heat pump has a maximum power of 20 kW and this maximum power is associated with the lowest temperatures of −18° C., −15° C. and −12° C., which are to be expected in Climatic Zones 1, 2 and 3, resepectively, and represented by the points 45, 46 and 47, and these points are connected by straight lines to the point 43.

It is possible, for instance, to provide three heat pumps in the program of a manufacturer, the first of which has a maximum power of 10 kW, the second a maximum power of 20 kW and the third a maximum power of 30 kW. In dependence on the heat insulation and other conditions of the residential building which is to be heated, the type of heat pump to be used is selected first in consideration of the maximum heat rate which can be generated by the heat pump. Then the location where the heat pump is to be installed is considered and the set point signal generator is pre-adjusted to program the controller in such a manner that the selected heat pump will deliver its maximum power at the lowest outdoor temperature in the climatic zone in which the heat pump is to be installed. These two considerations result in one of the Curves I to III, depending on the heat pump employed. It has thus been determined which set point representing the instantaneous power of the heat pump will be used in the controller in further dependence merely on the actual temperature.

Figure 3:
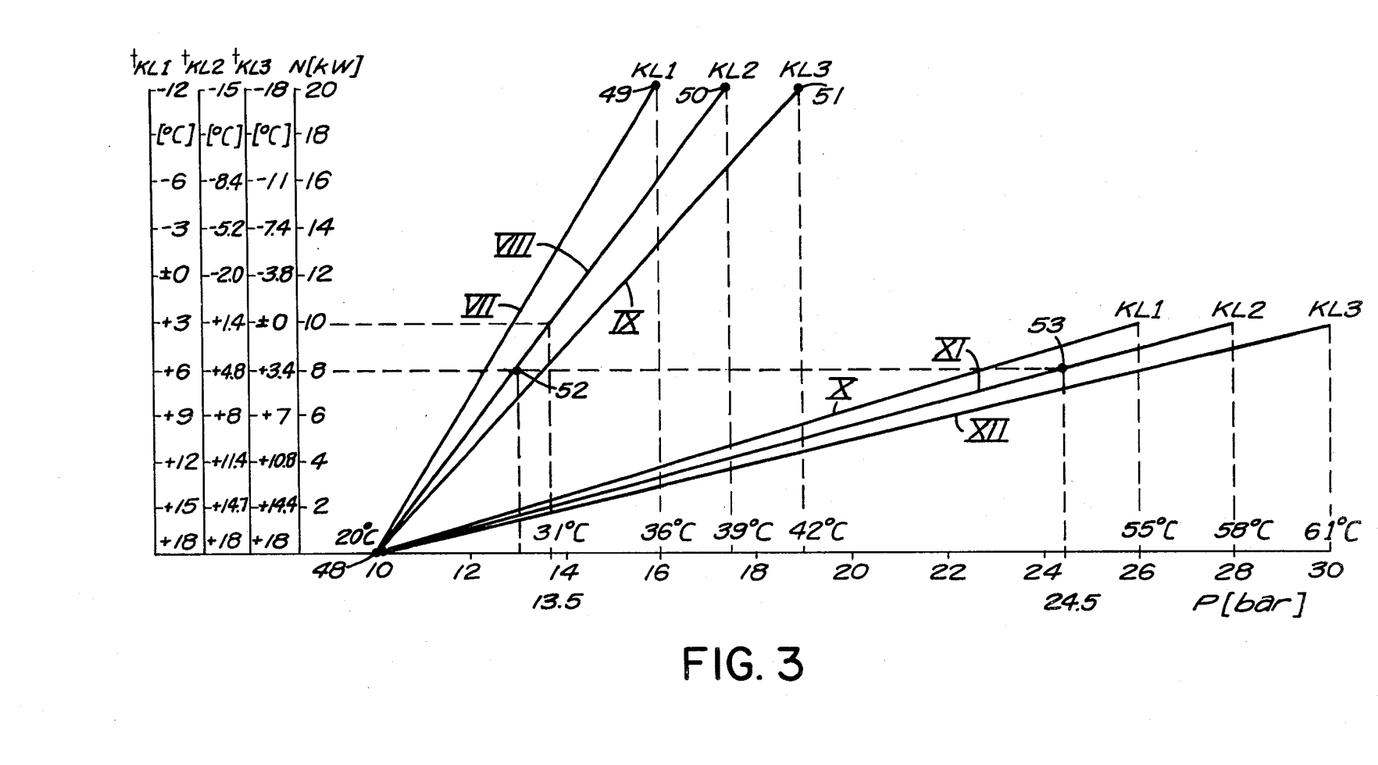

The further proceeding will be described more fully with reference to FIG. 3, in which the condenser pressure or, expressed more generally, the pressure in the high-pressure part of the heat pump, and the temperature in the main leading to the consumer are plotted against the abscissa. In FIG. 1, the high pressure part of the heat pump is the refrigerant vapor flow path from the generator to the expansion valve and the flow path for the weak solution from the generator to the expansion valve. The origin is associated with a condenser pressure of 10 bars. This corresponds to a room temperature and a flow temperature of 20° C. and is defined by the point 48.

The temperatures in Climatic Zones I, II and III are plotted against the ordinate. These temperatures begin with +18° in the origin and reach their maxima at the final temperatures of the climatic zones, namely, −12° C., −15° C. and −18° C., respectively. The power of the heat pump in kW is plotted against the ordinate as the fourth scale. The power increases from 0 kW, which corrresponds to an outdoor temperature of 18° C. and is associated with the origin 48, to the nominal power of the heat pump, which amounts in this case to 20 kW and corresponds to the lowest temperature to be expected in the respective climatic zone.

Curves VII, VIII, IX are based on the parameter of a low-temperature heating system for monovalent operation of the heat pump, for instance, a floor-heating system. Points 49, 50 and 51 correspond to selected flow temperatures of 36° C., 39° C. and 42° C., which are associated with respective lowest outdoor temperatures in the climatic zones. When the dimensions of the heating system, i.e., the consumer, are selected with the aid of the heat requirement calculation, it is possible to determine the flow temperature which is required in a given building and in a given heating system in order to ensure that the building will be heated in a manner which satisfies the wishes of the consumer at the final temperature in the given climatic zone. Curves VII, VIII and IX will then be obtained by connecting each of the points 49 to 51 to the origin 48. If the controller 10 operates along such a curve, the scale on the abscissa and the positions of the curves will automatically determine for any measured outdoor temperature a condenser pressure which is indicated to the controller as the set point.

For instance, the heat pump may again have a power of 20 kW and may be installed in Climatic Zone 2. Based on the heat requirement calculation and the location of installation and the nominal power of the heat pump, Curve VII would then be applicable. If the actual outdoor temperature is +4.8° C., the point 52 on Curve VIII is applicable which is associated with a condenser pressure of 13 bars as well as with a flow temperature of 30° C. For this reason, as long as the outdoor temperature does not change, the controller will control the flow temperature in accordance with the set point of 30° C. In case of a drop or rise of the outdoor temperature, Curve VIII represents the set point characteristic for the controller. In other words, the set point for the temperature which is to be maintained constant will vary in accordance with Curve VIII. For instance, in case of a drop of the outdoor temperature from 4.8° C. to 1.4° C., the new set points for the condenser pressure and the flow temperature will be 13.5 bars and 31° C., respectively. The second family of curves designated X, XI and XII is obtained if the heat pump is based on the parameter of a high-temperature heating system, e.g., a radiator heating system having a flow temperature of 90° C. and a reflux temperature of 70° C. at the maximum power. It is apparent that, e.g., in a heat pump having a maximum power of 20 kW and installed at a location in Climatic Zone 2, the above-selected actual outdoor temperature of 4.8° C. is now associated in point 53 with a nominal pressure of the condenser of 24.5 bars. This corresponds further to a nominal flow temperature of almost 53° C.

If the outdoor temperature decreases further, point 53 will thus continue to move on Curve XI toward the maximum power, which will be reached at a condenser pressure of 28 bars and a flow main temperature of 58° C. In case of a further drop of the outdoor temperature, a change over to an alternative heating system is required.

Figure 4:
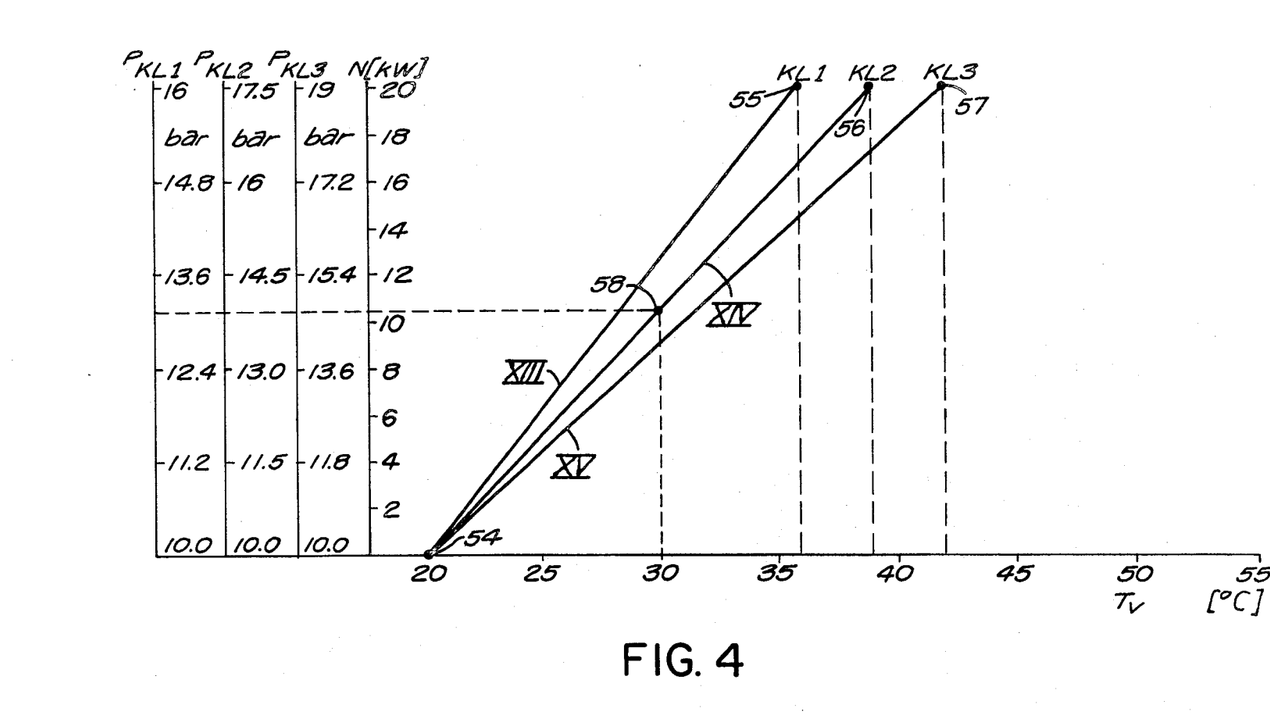
Figure 5:
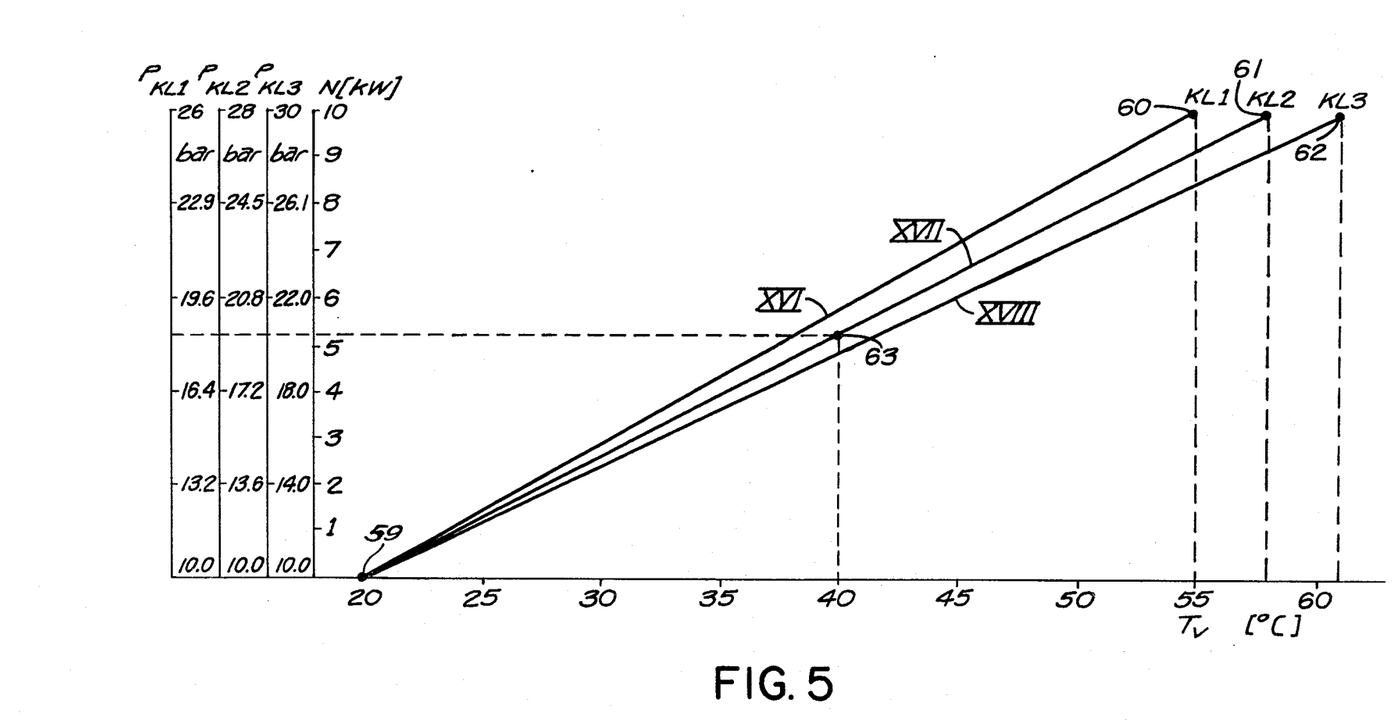

Additional possible variations regarding the heating system which constitutes the consumer are shown in FIGS. 4 and 5. In FIG. 4, the flow temperature of a low-temperature heating system for monovalent operation is plotted against the abscissa and the power of the selected heat pump, in kW, initially against the ordinate. Maximum pressures of 16, 17.5 and 19 bars are assigned to Climatic Zones 1, 2 and 3, respectively. These pressures are obtained at a power of 20 kW and represent the maximum nominal pressures obtained at the lowest temperatures in the respective climatic zones. The origin 54 for the family of curves shown in FIG. 4 corresponds to a flow temperature of 20° C., which corresponds to a desired room temperature of 20° C. This is associated with a pressure of 10 bars, which is independent of the location and the climatic zone of the heat pump. In this way, the nominal pressure is coordinated with the power of the heat pump and both variables are coordinated with the flow temperature.

This coordination results in Curves XIII to XV. The peak values 55, 56 and 57 of the Curves XIII to XV, respectively, are obtained in that the maximum power of the heat pump is associated with the maximum pressure and the latter, in dependence on the climatic zone which is applicable, associated with a maximum flow temperature of the heating system, the latter temperature being determined by means of the heat requirement calculation. It may be assumed, for instance, that again a heat pump having a nominal power of 20 kW is to be installed at a location in Climatic Zone 2 and that a flow temperature of, e.g., 30° C. is required in view of the lowest outdoor temperature. This flow temperature leads to a point 58 on Curve XIV. A nominal pressure of 14 bars and a heat pump power of 10.5 kW are associated on the ordinate with this point.

In FIG. 5 the parameter resides in that as the heating system a high-temperature radiator system is used which is operated, in the case of maximum load, with a flow temperature of 90° C. and a reflux temperature of 70° C. The system is designed for bivalent operation in that it will be supplied by the heat pump when the outdoor temperature is at or above a certain limit and by the heat pump in the above-mentioned pure boiler mode of operation when the outdoor temperature is below that limit. The flow temperature TV is plotted in degrees Centigrade against the abscissa and, as in FIG. 4, the nominal power of the heat pump and associated maximum pressures in the condenser or high-pressure part of the heat pump, in dependence on the climatic zone in which the pump is to be located, are plotted against the ordinate. Owing to the bivalent operation, the maximum power of the heat pump is limited to 10 kW in this example. In dependence on the climatic zone, this corresponds to a maximum nominal pressure of 26 bars in Climatic Zone I, 28 bars in Climatic Zone 2 and 30 bars in Climatic Zone 3. The origin 59 is defined by a heat pump power of 0 kW at a condenser pressure of 10 bars and a flow temperature of 20° C. of the heating system. The peaks 60, 61 and 62 of Curves XVI to XVIII are obtained in that certain maximum flow temperatures of 55° C., 58° C. and 61° C. are associated with the maximum power of the heat pump of 10 kW, and with the maximum nominal pressure. The curves represent the connections of the respective points 60 to 62 with the origin 59.

It is assumed, for instance, that in the case of a heat pump power of 10 kW, the actual outdoor temperature calls for a flow main temperature of 40° C., when the heat pump is installed at a location in Climatic Zone 2. This leads to a point 63, with which a power of 5.3 kW and a nominal condenser pressure of about 19 bars, plotted against the abscissa, are associated.

Figure 6:
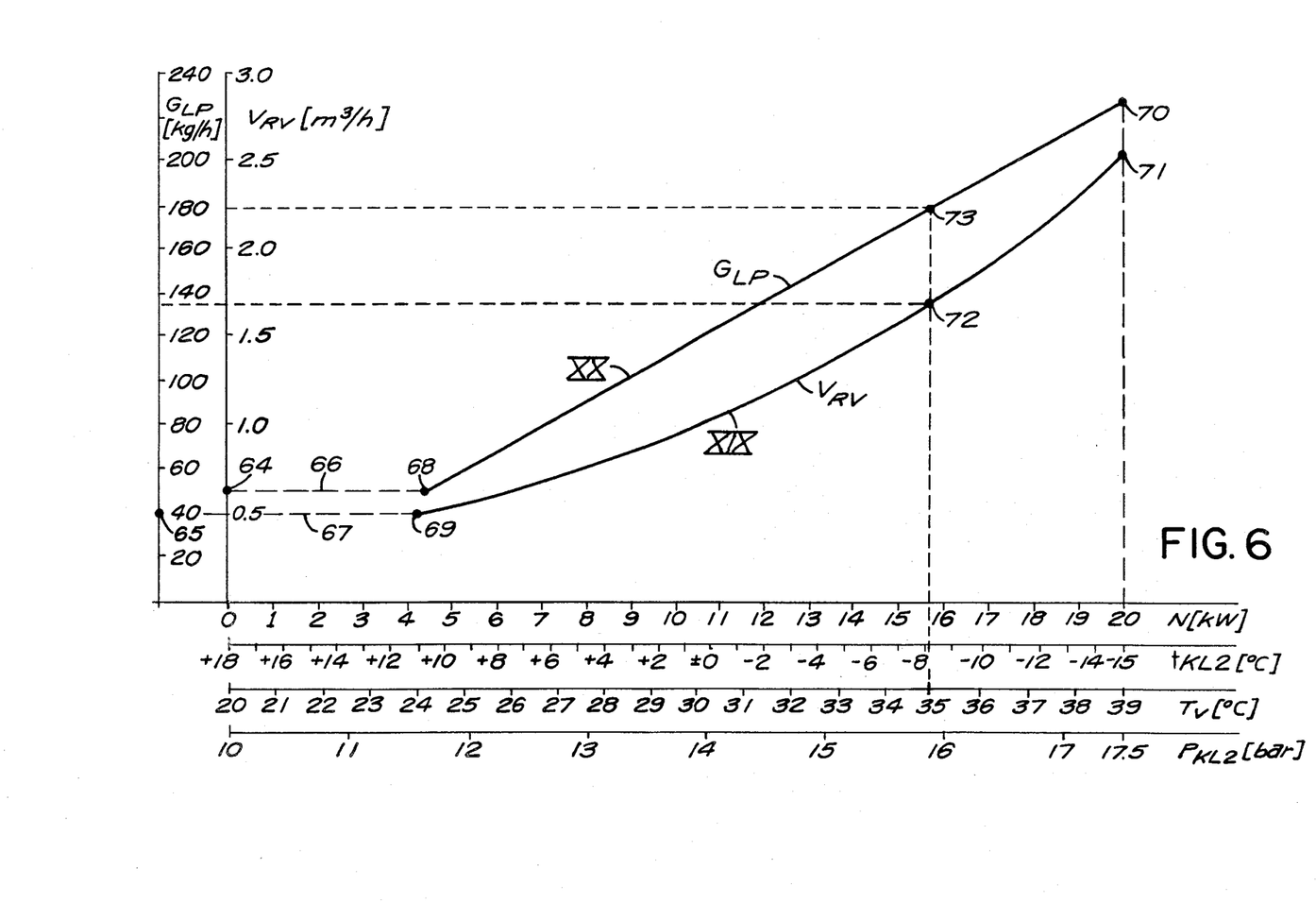

When a heat pump having a given maximum power has been selected and in dependence on the climatic zone that maximum power has been associated with the lowest outdoor temperature which is to be expected at the location of the pump and the set condenser pressure has been determined, then it will merely be required to associate a position of the solenoid gas valve 6 and a speed of the motor 23 for driving the solvent pump 22 to the nominal condenser pressure. FIG. 6 is provided for illustrating this association. In FIG. 6, the power of the heat pump up to a maximum power of 20 kW is plotted against the abscissa. Additional scales associated with that power are the temperature scale for Climatic Zone 2, the flow temperature TV for a floor-heating system and the condenser pressure P. This example is thus based on a heat pump having a maximum power of 20 kW and a location of installation in Climatic Zone 2. The flow rate GLP of rich solution in kg/h and the rate of gas flow VRV to the burner in m³/h are plotted against the ordinate. The gas flow rate is represented by Curve XIX and the solvent flow rate by Curve XX. Both curves have linear, constant portions 66 or 67, which extend from the origin 64 or 65 to break points 68 or 69. In that region, the solenoid gas valve 6 or the motor for the solvent pump 23 are pulse-controlled to operate with a varying pulse/no pulse ratio. From the break point 68, Curve XX is a straight line to the peak 70. From the break point 69, Curve XIX has a parabolic curvature. The peak 71 of Curve XIX and the point 70 on the abscissa are associated with the maximum power of the heat pump, amounting to 20 kW in this case. This corresponds to the lowest temperature in the climatic zone, amounting to −15° C., to the maximum flow temperature, amounting to 39° C., and to the maximum nominal pressure in the high-pressure part of the heat pump, amounting to 17.5 bars. The associated ordinate values are obtained in accordance with the maximum gas flow rate which is associated with the required power of 20 kW and with the maximum solvent flow rate required for that power. For instance, when the actual outdoor temperature required a flow main temperature of 35° C., points 72 and 73 on Curves XIX and XX will be obtained. The ordinates of these two points indicate that a solvent flow rate of 135 kg/h is required. A certain pump speed can be associated with that nominal flow rate. Point 73 indicates further that a gas flow rate of 2.25 m³/h is required to obtain an actual power of 15.8 kW and to maintain a condenser pressure of 15.8 bars. The controller delivers corresponding signals for controlling the gas flow rate and the voltage to be applied to the motor 23 for driving the solvent pump 22, so that the latter will operate at such a speed that a certain flow rate will be obtained when the volumetric flow rate per revolution is fixed. Of course, the data for the solvent flow rate and the gas flow rate can be determined also for other climatic zones, other maximum powers and other heating systems.

Curve XIX, which represents the fuel flow rate through the solenoid gas valve in dependence on the outdoor temperature, rises parabolically as the outdoor temperature decreases. It has been found that, starting from a minimum gas flow rate, the actual gas flow rate is suitably controlled in accordance with the following equation:

$$\bar{V}_{RV} = \bar{V}_{RVmin} + A(N - N_{min})1 + (\xi \dot{V}_{RVmin} - \xi \dot{V}_{RV})$$

wherein $\dot{V}_{RV}$ is the rate in m³/h at which gas is supplied to the heat pump as a function of the desired power, which is proportional to the outdoor temperature or the flow temperature or the pressure in the high-pressure part of the system, as is shown on the abscissa of FIG. 6. This gas flow rate equals the initial gas flow of $\dot{V}_{RVmin}$, which is represented by point 69 of FIG. 6. The gas flow rate must not decrease below that minimum because a burner cannot be infinitely adjusted from a maximum load to a zero flow rate. In a first approximation, the gas flow rate is initially a linear function of power, expressed by the term $A \times (N - N_{min})$, wherein A is a constant corresponding to the gas flow rate in m³/h divided by the power in kW. This constant depends on the dimensions and in our example amounts to about 1/7. N is the actual power in kW and $N_{min}$ the power below which the burner is no longer infinitely controlled and which in the present example is about 4.5 kW. The linear relation is supplemented from $N_{min}$ to $N_{max}$ by the correcting term $\xi \dot{V}_{RVmin}$ minus $\xi \dot{V}_{RV}$, wherein $\xi \dot{V}_{RVmin}$ is the heat ratio at the corresponding power $N_{min}$; this corresponds to the outdoor temperature which corresponds to the lowest gas flow rate that can be adjusted, and $\xi \dot{V}_{RV}$ represents all heat ratios between $N_{min}$ and $N_{max}$ which correspond to the outdoor temperature from the temperature associated with $N_{min}$ to the maximum design temperature associated with that temperature or pressure in the high-pressure part which is associated with $N_{min}$. This correction allows for the fact that due to the poorer heat ratio, more energy must be supplied by the gas when the solvent flow rate is constant. This is due to the fact that at higher pressures in the high pressure part and higher condensing temperatures more power must be supplied to the generator if refrigerant vapor is to be expelled at the same ratio as at lower temperatures and lower pressures in the high-pressure part.

I claim:

1. A method of determining the set point of a pressure/temperature controller for the high-pressure part of a sorption heat pump, the controller includes a pressure-temperature sensor as a measurement generator and a fuel valve and a solvent pump as control elements, comprising the steps of establishing the maximum power to be delivered by the sorption pump to a consumer, pre-adjusting the sorption heat pump to operate at the maximum power based on the lowest outdoor temperature established for the given climatic zone in which the pump operates, establishing a linear proportional characteristic curve with one end of the curve determined by the maximum power at the lowest outdoor temperature and the other end determined by zero power for a given temperature above the lowest outdoor temperature, sensing the outdoor temperature, converting the sensed temperature to nominal pressure/temperature value for the controller based on the linear curve and controlling the power delivered by the sorption heat pump via the controller as determined by the outdoor temperature.

2. A method, as set forth in claim 1, associating certain values for the fuel and solvent flow rates with the nominal pressure/temperature values.

3. A method according to claim 1 or 2, wherein, during bivalent operation, assigning the maximum power of the heat sorption pump to the temperature at which the mode of operation of the heat pump is changed.

4. A method of determining the set point of a temperature or pressure controller of a heat pump, such as an absorption heat pump, comprising the steps of
   (a) associating the maximum power of the heat pump with the lowest expected temperature for the given climatic zone in which the heat pump is located;
   (b) associating the minimum power of the heat pump with an outdoor temperature setting the upper level at which the heat pump operates;
   (c) associating curves with the heating systems serving as consumers for the heat pump with each curve having an end point corresponding to the lowest flow temperature of the system and another end point corresponding to the maximum flow temperature of the system and determining the maximum flow temperature as the lowest outdoor temperature to be expected in the climatic zone in which the heat pump is located;
   (d) associating the flow temperature of the heating system with certain pressure temperature values in the high pressure part of the pump;
   (e) associating the values of the solvent flow rate and the fuel flow rate jointly with the nominal pressure/temperature values in the high-pressure part of the heat pump and associating 100% solvent flow rate with the maximum power and associating the minimum flow rate with 10% of the maximum power of the heat pump and associating 100% fuel flow rate with the maximum power of the heat pump and associating the minimum fuel flow rate with 10% of the maximum power of the heat pump so that the values between the minimum and maximum gas flow rate correspond to the relation:

$$\bar{V}_{RV} = \bar{V}_{RVmin} + A(N - N_{min})1 + (\xi \dot{V}_{RVmin} - \xi \dot{V}_{RV}).$$

* * * * *

UNITED STATES PATENT AND TRADEMARK OFFICE
CERTIFICATE OF CORRECTION

PATENT NO. : 4,463,570
DATED : August 7, 1984
INVENTOR(S) : Alexander Kantner

It is certified that error appears in the above-identified patent and that said Letters Patent is hereby corrected as shown below:

In the heading of the Patent it should read:

[30]  Foreign Application Priority Data

Mar. 14, 1981 [DE]    Fed. Rep. of Germany ...8107912[U]
Feb. 27, 1982 [DE]    Fed. Rep. of Germany ...8205716[U]

Signed and Sealed this

Twelfth Day of March 1985

[SEAL]

Attest:

DONALD J. QUIGG

*Attesting Officer*   *Acting Commissioner of Patents and Trademarks*